US006378170B1

(12) United States Patent

Foucault et al.

(10) Patent No.: US 6,378,170 B1
(45) Date of Patent: Apr. 30, 2002

(54) SECURITY SEAL FOR COLLARS USED TO TENSION SPRING IN GARAGE DOOR ASSEMBLIES

(75) Inventors: Pierre-Louis Foucault, St.-Lambert (CA); Ron Clark, Millersburg, OH (US); Alexandre Hebert, Brossard (CA); Pascal Provencher, Drummondville (CA); Patrice Farella, Saint-Jean-sur Richelieu (CA)

(73) Assignee: Canimex, Inc., Quebec (CA)

( * ) Notice: Subject to any disclaimer, the term of this patent is extended or adjusted under 35 U.S.C. 154(b) by 0 days.

(21) Appl. No.: 09/537,840

(22) Filed: Mar. 29, 2000

Related U.S. Application Data

(60) Provisional application No. 60/126,657, filed on Mar. 29, 1999.

(51) Int. Cl.[7] ................................................ F16L 55/00

(52) U.S. Cl. ............................. 16/198; 16/196; 49/200; 160/188; 411/910

(58) Field of Search .......................... 16/198, 196, 197, 16/200, 404, 400; 49/200; 160/188, 189, 201; 411/910, 377, 372.5, 372.6, 315, 316

(56) References Cited

U.S. PATENT DOCUMENTS

| | | | | |
|---|---|---|---|---|
| 5,397,012 A | * | 3/1995 | Tison et al. | 220/214 |
| 5,524,945 A | * | 6/1996 | Georpopuoulos et al. | 292/307 |
| 5,542,724 A | * | 8/1996 | Netto | 292/317 |
| 5,765,885 A | * | 6/1998 | Netto | 292/318 |

FOREIGN PATENT DOCUMENTS

| | | | |
|---|---|---|---|
| GB | 2218050 A | * | 11/1989 |

* cited by examiner

*Primary Examiner*—Anthony Knight
*Assistant Examiner*—Mark Williams
(74) *Attorney, Agent, or Firm*—Merchant & Gould P.C.

(57) ABSTRACT

A security seal for a collar used for tensioning springs in garage door assemblies. A collar typically includes at least one set screw projecting outwardly and at least two winding holes. The security seal of the invention includes a generally longitudinal piece of flexible material having two opposite ends, the opposite ends being provided with a locking system for locking the opposite ends together in a permanent fashion. The seal also has at least one hollow cup adapted to receive the at least one set screw and at least two solid cups, each of the cups being adapted to fit with a corresponding winding hole. The hollow cup and the at least two solid cups are disposed on the security seal so that when the seal is locked above the collar, the hollow cup and the solid cups are in registration with the at least one set screw and the at least two winding holes respectively.

8 Claims, 6 Drawing Sheets

SECURITY SEAL FOR COLLARS USED TO TENSION SPRING IN GARAGE DOOR ASSEMBLIES

This application claims benefit to Provisional Application 60/126657 filed Mar. 29, 1999.

FIELD OF THE INVENTION

The present invention relates to a security seal placed around collars which are used to tension counterbalance springs in garage door assemblies.

DESCRIPTION OF THE PRIOR ART

Large, vertical opening doors, such as commercial and residential sectional garage doors, usually require mechanisms to counterbalance the weight of the door in order to minimize door opening efforts and to control movement of the door from an open to a closed position. Large sectional garage doors for commercial and residential applications may be manually or power operated. In either case, but particularly for manual operation, counterbalance mechanisms have been used for many years to counterbalance the weight of the door and control its opening and closing movements so that one person can easily control operation of the door. Counterbalance mechanisms are also advantageous for power operated vertical opening doors since they reduce motor power requirements and the strength of the door opening and closing mechanism. In other words, lighter weight, lower cost door control mechanisms may be used if a counterbalance mechanism is connected to the door to assist the opening and closing action. Still further, the provision of a counterbalance mechanism minimizes the chance of rapid and uncontrolled closing of the door in the event of failure of the door opening and closing mechanism, which can result in injury or damage.

A widely used type of counterbalance apparatus comprises, generally, a pair of spaced apart cable drums connected to flexible cables, which in turn are connected to lower opposed edges of the garage door. The cable drums are usually mounted on a shaft which is supported above the door opening and is connected to one or more torsion springs which are fixed at one end to the shaft and are secured to the wall at the opposite end so that the cable drums are biased to rotate in a direction which winds the cables onto the drum and counteracts the weight of the door connected to the cables. The torsion springs are adjusted to properly balance the weight of the door so that minimal opening and closing effort is required, either manually or motor controlled.

Conventional, low cost adjustment mechanism for the above mentioned type of counterbalance apparatus, and widely used in the door industry, is characterized by generally cylindrical collars commonly also referred to as "plugs" (or cones) which are connected to the so-called fixed ends of the torsion springs and are mounted on the aforementioned shaft for adjusting the deflection of the springs to preset the counterbalance effort. The aforementioned collars usually include one or more setscrews which lock the collars to the shaft to prevent rotation except during adjustment of the spring deflection. The collars also include sockets for receiving winding bars whereby the springs are manually preset by rotating the collars using the winding bars and then locking-the collars to the shaft with the set screws.

One problem associated with this type of counterbalance apparatus, or any other type of counterbalancing mechanism which uses winding collars and tensioning springs, is that to a casual observer, they appear harmless. Consequently, some people will attempt to unscrew the setscrews, for any number of reasons. However, the combination of the collars and the tensioning springs maintains a considerable torque on the shaft. Once the setscrews are loosened, the torque causes the collars to rotate about the shaft with high velocity and high force, which often results in serious personal injury including death or serious property damage.

SUMMARY OF THE INVENTION

It is an object of the invention to provide a security seal for such collars used for tensioning springs in garage door assemblies. Such a seal will help prevent people from being injured by any component under tension (or torque) by warning and blocking access to the collar. In accordance with the invention, this object is achieved with a seal comprising a generally longitudinal piece of flexible material having two opposite ends, the opposite end being provided with cooperating lock means for locking the opposite ends together, and means for preventing access to at least one socket and at least one screw used to maintain tension on the plug when the seal is placed about the collar.

In a preferred embodiment of the invention, this object is achieved with a security seal for a collar comprising:

- a generally longitudinal piece of flexible material having two opposite ends, the opposite ends being provided with cooperating lock means for locking the opposite ends together;
- at least one cup adapted to receive the at least one set screw therein; and
- at least two protuberances, each of said protuberances being adapted to fit within a corresponding winding hole; whereby the at least one cup and the at least two protuberances are disposed on said security seal so that when said seal is locked about said collar, said cup and said protuberances are in registration with the at least one set screw and the at least two winding holes respectively.

Once the seal is wrapped around the collar and locked, a casual observer will not be tempted to break the seal and attempt to unscrew the setscrews. Preferably, the seal is made of a color representing danger, and may further be inscribed with appropriate warnings.

BRIEF DESCRIPTION OF THE DRAWINGS

The present invention and its advantages will be more easily understood after reading the following non-restrictive description of preferred embodiments thereof, made wit reference to the following drawings in which.

DESCRIPTION OF PREFERRED EMBODIMENTS OF THE INVENTION

The following is a technical description of the security seal according to the invention. The numbers between parenthesis refer to the enclosed drawings.

Figure 1:
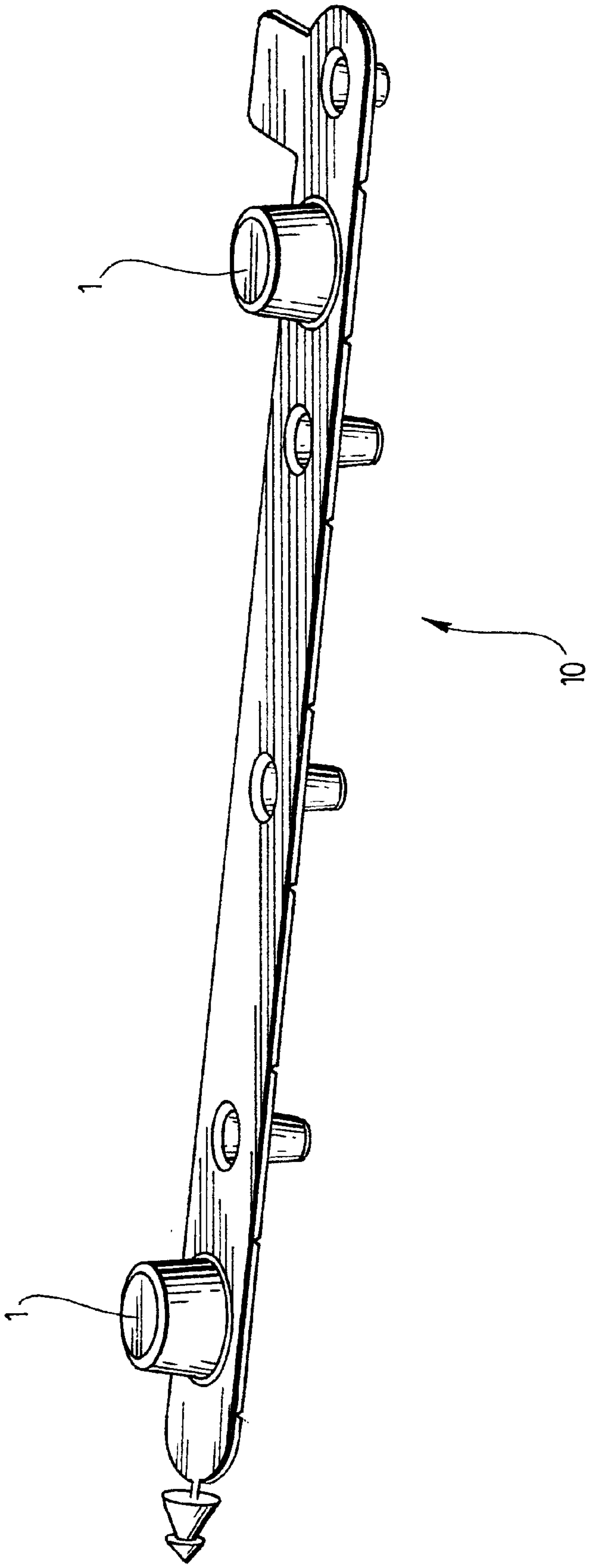
FIG. 1 is a top perspective view of a security seal according to the invention when wrapped.
Figure 2:
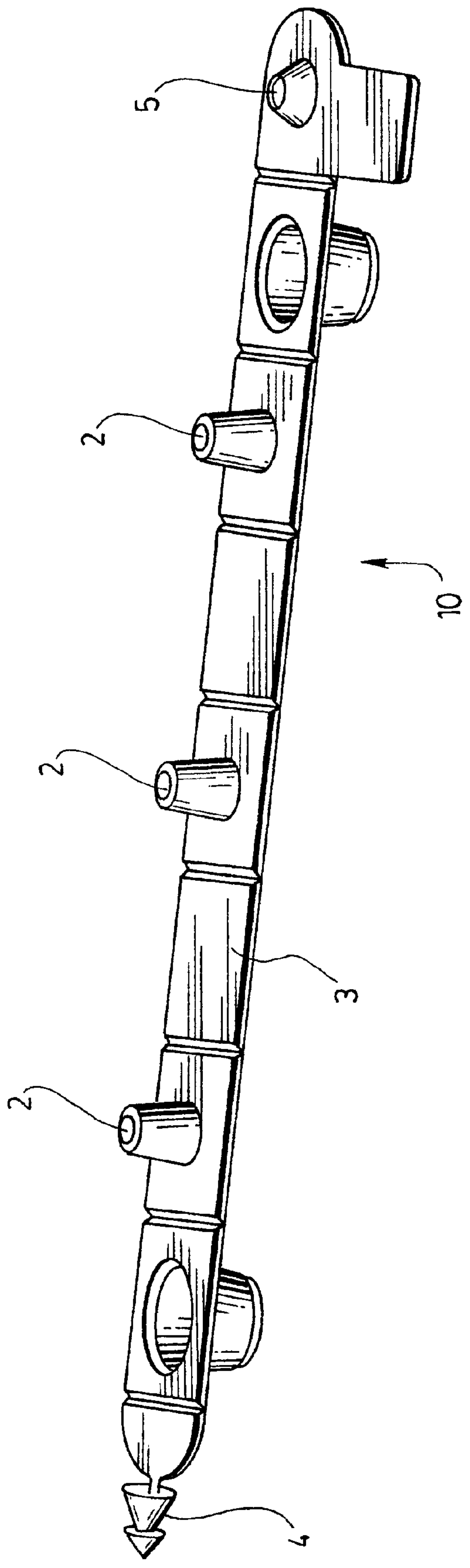
FIG. 2 is a bottom perspective view of the security seal of FIG. 1.
Figure 3:
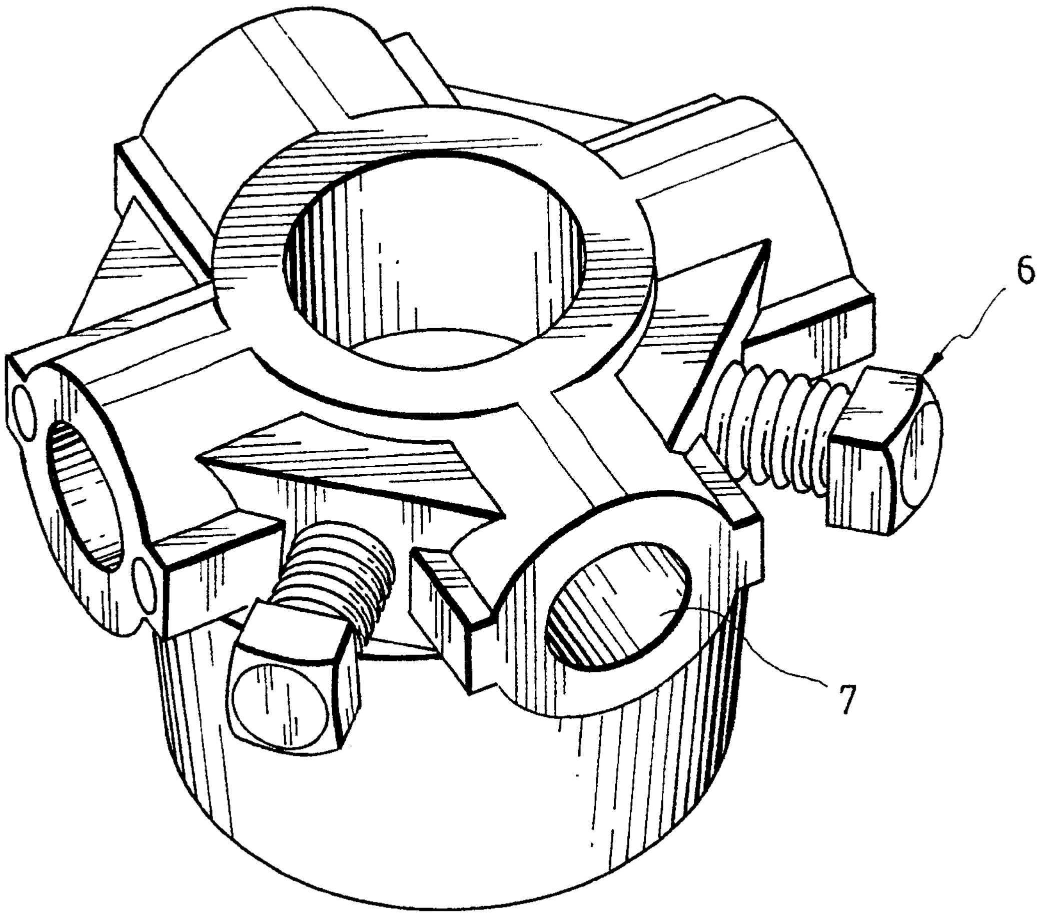
FIG. 3 is a perspective view of a collar of the prior art.

The security seal 10 according to the present invention is used to tamper-proof winding collars used in a garage door assembly. Winding collars, such as the one shown in FIG. 3, include a plurality of sockets 7 and set screws 6, as mentioned above. The sockets are used to wind a torsionnal spring; once the spring is wound to the desired torque, the set screws are set to maintain the collar in position and transfer the torque to the shaft. The torque produced can be very dangerous for any unaware user that would like to modify the installation of the door. The present invention thus provides a security seal to prevent people from being injured by any part under tension by warning and blocking the access to the winding collar. The people concerned will have to break the seal if they want to modify the installation of the winding collar.

As mentioned in the background of the invention, there is no such seal known to this day. Numerous seals exist on the market but none for this application and none with the structure of the present invention, as far as Applicant knows.

The seal according to the preferred embodiment of the invention and as illustrated in FIGS. 1, 2, 4 and 5, is a generally longitudinal piece of flexible material (3) having two opposite ends, the opposite ends being provided with cooperating lock means for one-time locking the opposite ends together. The seal also includes means for preventing access to at least two sockets and at least one set screw forming part of a collar. To that effect, theses means preferably comprise five cups on a plastic strap (3) ended by a locking system (4, 5). The locking system is preferably of the permanent type in that once locked, it cannot be unlocked short of breaking the seal.

There are two sizes of cups. The two larger, hollow cups (1) are used to hide the two set screws (6) on the winding collar and project outwardly once the seal is installed around a collar. The three smaller and solid cups (2) or other type of protuberances are used to hide the sockets (7) and to position the seal on the collar. The three protuberances or small cups (2) are also used to prevent any axial movement of the seal on the collar. The locking system is the last item to be installed. It is installed when all the components are well set under tension. The seal is wrapped around the winding collar. The cups are aligned with their respective components. The two opposite ends of the seal, i.e. where the locking system is, are locked in front of the fourth socket, located between the two set screws.

When installed properly, this seal prevents access to the winding collar. The two set screws used to maintain the tension in the spring are not reachable by any tool without breaking the seal. Furthermore, the four winding holes or sockets are not in sight of anyone and are obstructed so that no tools can be introduced in them. Therefore, an unaware user (home owner) will not be able to touch the highly dangerous component or if he does, it will be after breaking the seal.

The three protuberances for the sockets are preferably conical, and the largest diameter is smaller than the diameter of the sockets. The height insures that no object can be entered deeply enough in the socket. The distance between each protuberance (set screw cups and winding hole cup) is critical. It is this distance that makes the installation possible. Accordingly, the small cups and large cups must be in registration with the sockets and the set screws, respectively, when the seal is installed around a collar.

The two cups for the set screws are preferably conical, and the smallest diameter is larger than the head of the screw. The height (or depth of the cup) ensures that the screws can be protected even if they are screwed at the minimum. The distance between each cup is critical, since it is this distance which makes the installation possible. Accordingly, as mentioned previously, the small cups and large cups must be in registration with the sockets and the set screws, respectively, when the seal is installed around a collar.

Figure 4:
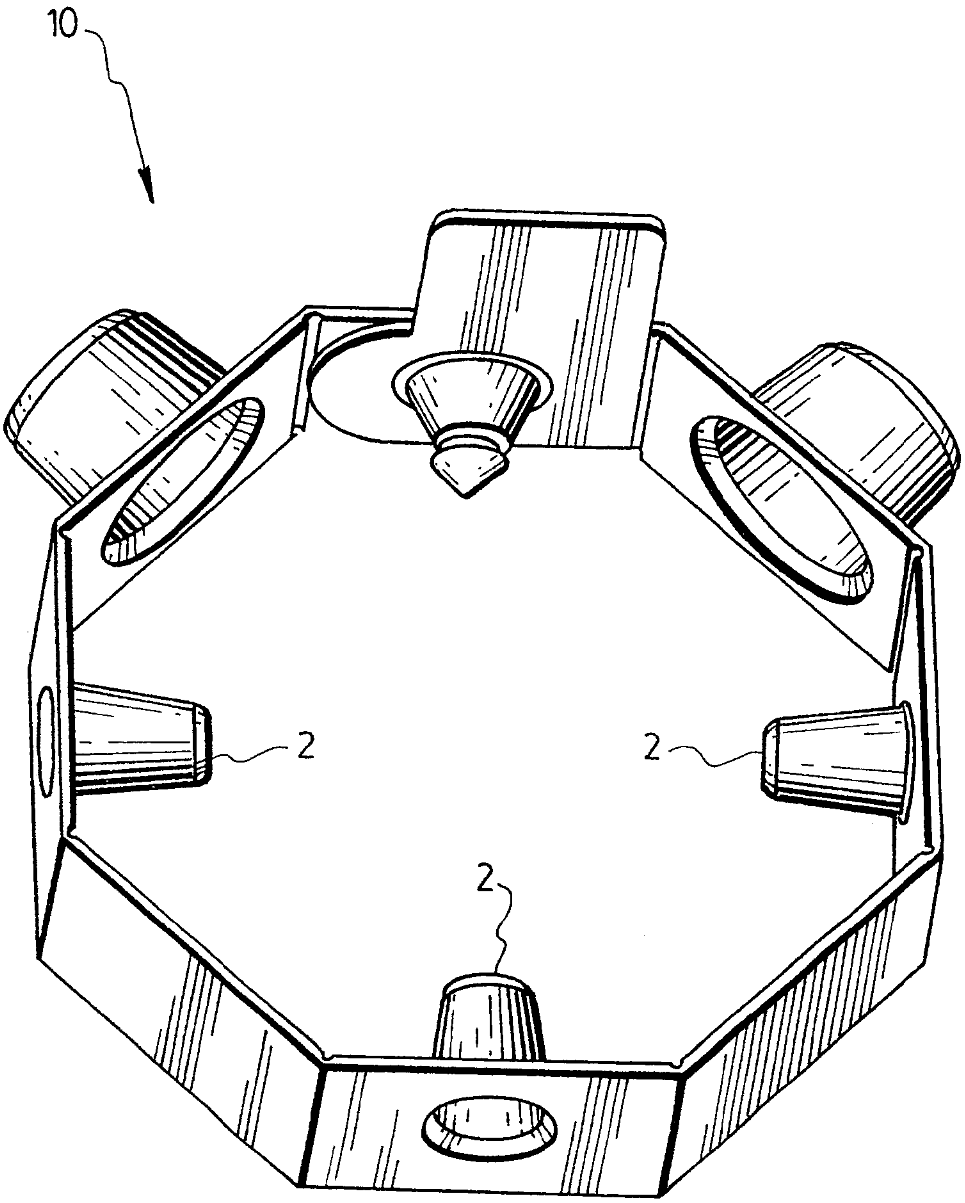
FIG. 4 is a perspective view of the security seal of FIG. 1 when wrapped.
Figure 5:
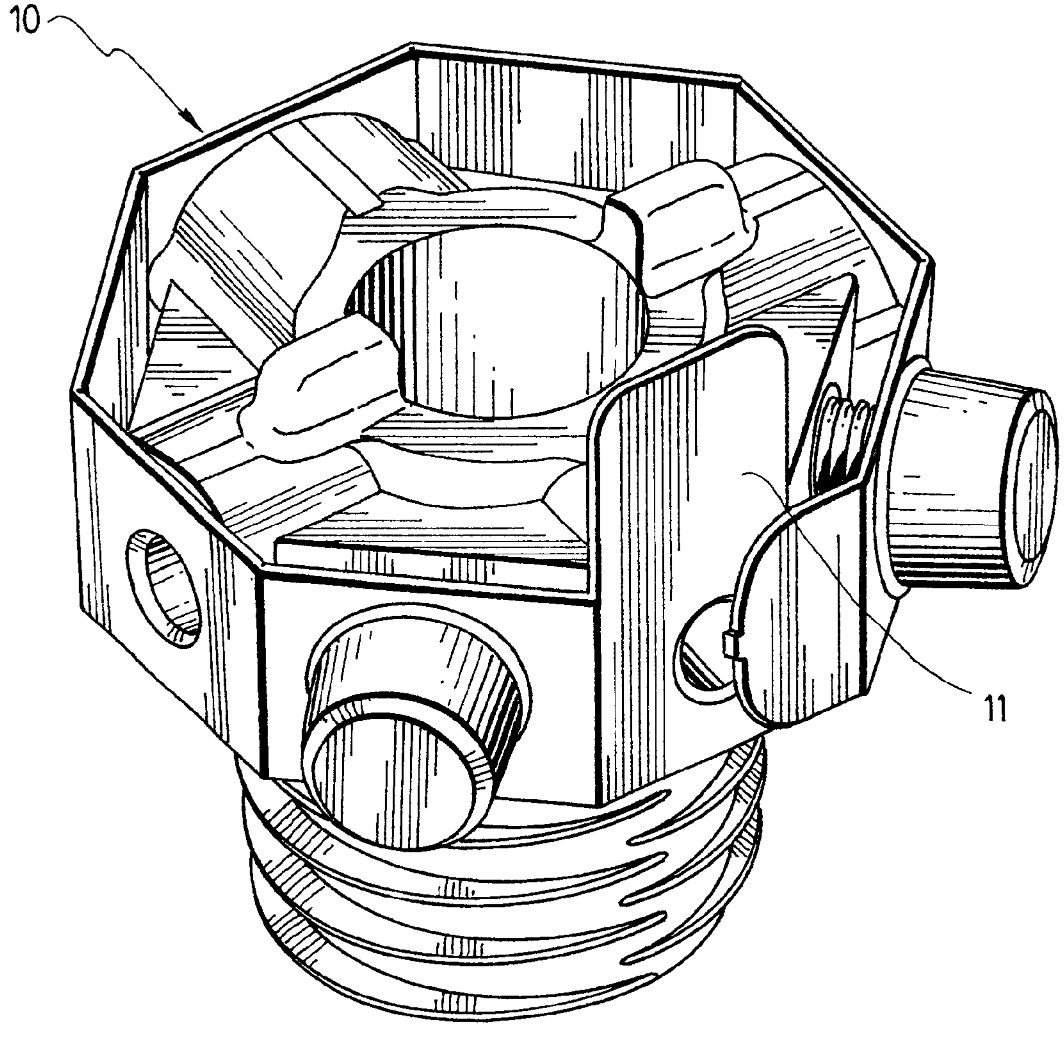
FIG. 5 is a perspective view of the security seal of FIG. 1 wrapped and installed around th collar of FIG. 3.

The locking system located at the two opposite ends of the strip can be any standard one-time locking system such as the one shown in FIG. 4, the important aspect of the locking system being that once it is locked, it is impossible to unlock without breaking it. The two opposite ends are preferably strategically located so that when the security seal is wrapped around the winding collar, they obstruct the fourth socket (located between the 2 set screws). For example, the locking means can include ratchet teeth inserted through an opening which is smaller than the height of the teeth, so that the teeth permit one-way entry through the opening. Alternatively, the system can be like that shown in FIG. 4, i.e. a conical portion adapted to fit in an opening which has a diameter smaller than the largest portion of the conical portion.

The strap, or longitudinal piece of flexible material, is large enough to be able to receive the 5 cups at their maximum diameter. The color of the seal is "warning orange". Preferably, the strap along with the cups and the locking system are made of strong, flexible plastic, although any other material which cannot be easily cut will meet the objects of the invention.

Further preferably, one of the opposite ends is provided with a tab (11), which bears a warning inscription.

It should however be understood that the security seal can be provided with less cups than in the preferred embodiment, provided that there is at least the same number of cups as set screws, since these project outwardly. In some cases, the collars are not provided with winding holes (other mechanisms are used to wind the collars), and so it is well within the skill of a person in the art to make the appropriate modifications to the seal with the scope of the invention.

Figure 6:
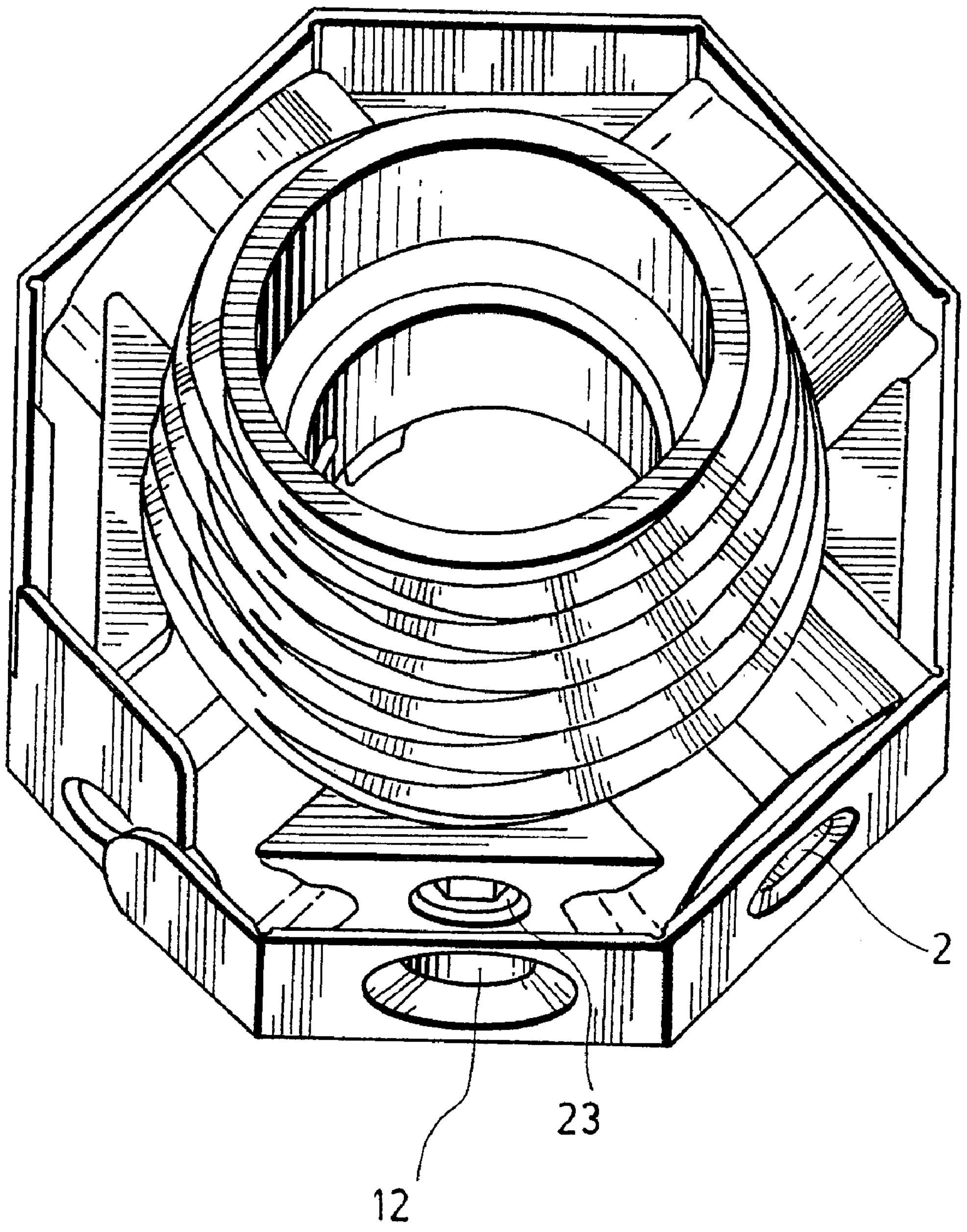
FIG. 6 is a perspective view of a security seal according to a second preferred embodiment of the invention.

Alternatively, the set screws can be Allan-type screws, so that they project inwardly (see FIG. 6). Consequently, the means for preventing access to the set screws and the winding sockets can be embodied only with the protuberances 2. Furthermore, if so required, the set screws can be blocked by protrusions 21, in addition to the protuberances. The protrusions 21 (or just one) penetrate slightly towards the top of the Allan-type set screw 23 in order to prevent access thereto.

Although the present invention has been explained hereinabove by way of a preferred embodiment thereof, it should be pointed out that any modifications to this preferred embodiment within the scope of the appended claims is not deemed to alter of change the nature and scope of the present invention.

What is claimed is:

1. A security seal for a collar used for tensioning springs in garage door assemblies, the collar including at least one set screw projecting outwardly and at least two winding holes, the security seal comprising:

a generally elongated piece of flexible material having two opposite ends, the opposite ends being provided with cooperating lock means for locking the opposite ends together;

at least one cup adapted to receive the at least one set screw therein; and at least two protuberances, each of said protuberances being adapted to fit within a corresponding winding hole;

whereby the at least one cup and the at least two protuberances are disposed on said security seal so that when said seal is locked about said collar, said cup and said protuberances are in registration with the at least one set screw and the at least two winding holes respectively thereby blocking access to the at least one set screw and the at least two winding holes.

2. A security seal according to claim 1, which includes three of said protuberances and two of said cups, said cups being respectively located adjacent said opposite ends, and said protuberances being located between said cups.

3. A security seal according to claim 2, wherein one of said opposite ends is provided with a tab bearing a warning inscription.

4. A security seal according to claim 3, wherein said security seal is orange.

5. A security seal according to claim 4, wherein said locking means are permanent.

6. A security seal for a collar used for tensioning springs in garage door assemblies, the collar including at least one set screw, and at least one socket for winding the collar, said security seal comprising a generally elongated piece of flexible material having two opposite ends, the opposite ends being provided with cooperating lock means for locking the opposite ends together, and means for preventing access to the at least one socket and the at least one set screw when the seal is placed about the collar.

7. A security seal according to claim 6, wherein said means for preventing access to the at least one set screw are for cooperating with a set screw projecting outwardly.

8. A security seal according to claim 6, wherein said means for preventing access to the at least one set screw are for cooperating with a set screw projecting inwardly.

* * * * *